United States Patent
Samuelsson et al.

(10) Patent No.: US 10,681,520 B2
(45) Date of Patent: Jun. 9, 2020

(54) ABILITY TO TRIGGER BEACON RECEIVER DEVICES IN A SHORT-RANGE WIRELESS BEACON COMMUNICATION SYSTEM

(71) Applicant: Crunchfish Proximity AB, Malmö (SE)

(72) Inventors: Joachim Samuelsson, Helsingborg (SE); Kristian Sylwander, Malmö (SE)

(73) Assignee: CRUNCHFISH PROXIMITY AB, Malmö (SE)

( * ) Notice: Subject to any disclaimer, the term of this patent is extended or adjusted under 35 U.S.C. 154(b) by 0 days.

(21) Appl. No.: 16/473,034

(22) PCT Filed: Dec. 22, 2017

(86) PCT No.: PCT/SE2017/051348
§ 371 (c)(1),
(2) Date: Jun. 24, 2019

(87) PCT Pub. No.: WO2018/117958
PCT Pub. Date: Jun. 28, 2018

(65) Prior Publication Data
US 2020/0092698 A1 Mar. 19, 2020

(30) Foreign Application Priority Data
Dec. 23, 2016 (SE) ...................... 1651738

(51) Int. Cl.
*H04B 7/00* (2006.01)
*H04W 4/80* (2018.01)
(Continued)

(52) U.S. Cl.
CPC ............... *H04W 4/80* (2018.02); *G01S 1/024* (2013.01); *H04W 4/06* (2013.01); *H04W 12/06* (2013.01); *H04W 76/11* (2018.02); *H04W 84/18* (2013.01)

(58) Field of Classification Search
CPC ......... H04W 4/02; H04W 4/021; H04W 4/12; H04W 4/20; H04W 4/23; H04W 4/80;
(Continued)

(56) References Cited

U.S. PATENT DOCUMENTS 9,485,721 B1 * 11/2016 Bertz .................... H04W 60/00
9,913,090 B2 * 3/2018 Phillips-Lubimiv ........................
H04L 67/303
(Continued)

OTHER PUBLICATIONS

Cabarkapa, D., et al., "Comparative analysis of the Bluetooth Low-Energy Indoor Positioning Systems," 12th International Conference on Telecommunication in Modern Satellite, Cable and Broadcasting Services (TELSIKS), Oct. 14, 2015, all enclosed pages cited.

(Continued)

*Primary Examiner* — Quochien B Vuong
(74) *Attorney, Agent, or Firm* — Burr & Forman, LLP

(57) ABSTRACT

A beacon communication system for improving the ability to trigger beacon receiver devices is disclosed. The beacon communication system (100; 100'; 100") comprises a short-range wireless beacon transmitter device (110; $A_1$; BTD) and a short-range wireless beacon receiver device (120; $P_1$; $MD_1$). The short-range wireless beacon transmitter device (110; $A_1$; BTD) is configured to repeatedly transmit a short-range wireless beacon advertisement signal (112; BA) on a first beacon broadcast channel (114), the first beacon broadcast channel being defined by a predefined unique identity (PUID) included in the short-range wireless beacon advertisement signal, the predefined unique identity remaining fixed between subsequent transmissions of the short-range wireless beacon advertisement signal (112; BA). The short-range wireless beacon transmitter device (110; $A_1$; BTD) is configured to temporarily transmit a short-range wireless beacon trigger signal (116; $BT_1$; $BT_2$) on an alter- (Continued)

nate beacon broadcast channel (118), the alternate beacon broadcast channel being defined by a dynamically allocated unique identity (DAUID1; DAUID2) included in the short-range wireless beacon trigger signal, the dynamically allocated unique identity being different from the predefined unique identity and being different between subsequent transmissions of the short-range wireless beacon trigger signal (116; $BT_1$; $BT_2$).

21 Claims, 8 Drawing Sheets

(51) Int. Cl.
*H04W 4/06* (2009.01)
*G01S 1/02* (2010.01)
*H04W 84/18* (2009.01)
*H04W 76/11* (2018.01)
*H04W 12/06* (2009.01)

(58) Field of Classification Search
CPC ..... H04W 8/005; H04W 48/10; H04W 48/16; H04W 52/0209; H04W 52/0225; H04W 84/12; H04W 88/08; G06Q 30/0251; G06Q 30/0261; G06Q 30/0267
See application file for complete search history.

(56) References Cited

U.S. PATENT DOCUMENTS

| | | | |
|---|---|---|---|
| 10,255,623 B2* | 4/2019 | Chatterton | G06F 21/44 |
| 2003/0050103 A1 | 3/2003 | Tourrilhes et al. | |
| 2008/0109302 A1 | 5/2008 | Salokannel et al. | |
| 2013/0182652 A1* | 7/2013 | Tong | H04W 72/0446 370/329 |
| 2014/0071959 A1 | 3/2014 | Ghosh et al. | |
| 2015/0195008 A1 | 7/2015 | Johnson et al. | |
| 2016/0156638 A1 | 6/2016 | Somani et al. | |

OTHER PUBLICATIONS

Search Report and Written Opinion of corresponding Swedish application No. SE 1651738-5 dated Jun. 26, 2017, all enclosed pages cited.

Examination report of corresponding Swedish application No. SE 1651738-5 dated Jun. 26, 2017, all enclosed pages cited.

International Search Report and Written Opinion of corresponding international application No. PCT/SE2017/051348 dated May 7, 2018, all enclosed pages cited.

\* cited by examiner

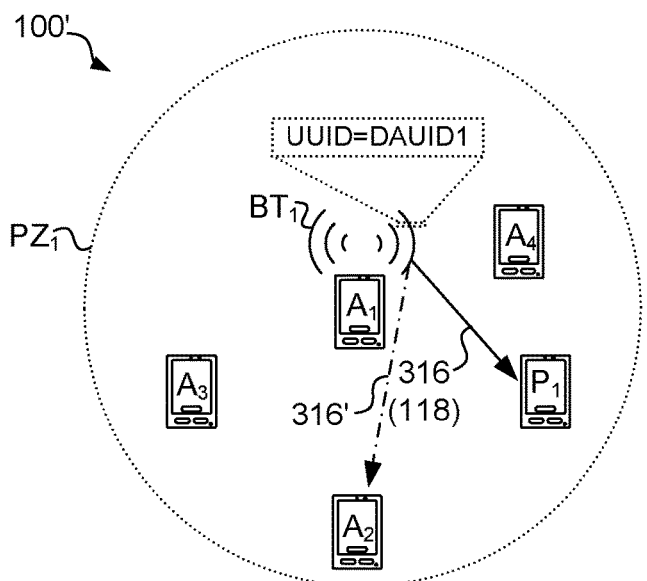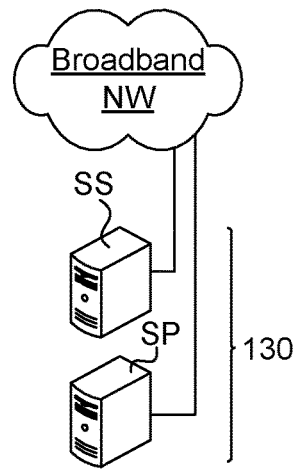
*Fig 3E*
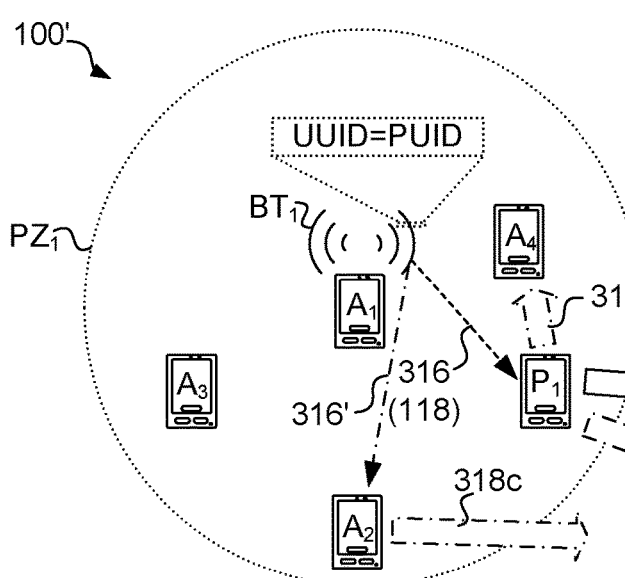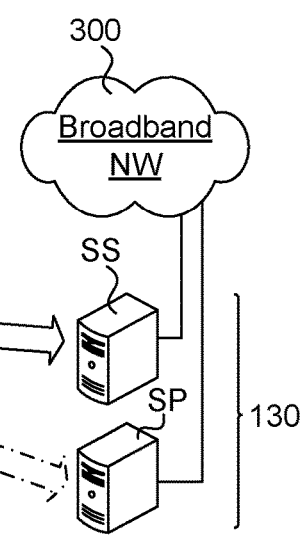
*Fig 3F*

**IMPROVED ABILITY TO TRIGGER BEACON RECEIVER DEVICES
IN A SHORT-RANGE WIRELESS BEACON COMMUNICATION SYSTEM:**

---

510
Short-range wireless beacon transmitter device 110; $A_1$; BTD repeatedly transmits a short-range wireless beacon advertisement signal 112; BA on a first beacon broadcast channel 114, the first beacon broadcast channel being defined by a predefined unique identity PUID included in the short-range wireless beacon advertisement signal, the predefined unique identity remaining fixed between subsequent transmissions of the short-range wireless beacon advertisement signal 112; BA

---

520
Short-range wireless beacon transmitter device 110; $A_1$; BTD temporarily transmits a short-range wireless beacon trigger signal 116; $BT_1$; $BT_2$ on an alternate beacon broadcast channel 118, the alternate beacon broadcast channel being defined by a dynamically allocated unique identity DAUID1; DAUID2 included in the short-range wireless beacon trigger signal, the dynamically allocated unique identity being different from the predefined unique identity and being different between subsequent transmissions of the short-range wireless beacon trigger signal 116; $BT_1$; $BT_2$

---

530
Short-range wireless beacon receiver device 120; $P_1$; $MD_1$ receives the short-range wireless beacon trigger signal 116; $BT_1$; $BT_2$ and performs an activity

*Fig 5*

ABILITY TO TRIGGER BEACON RECEIVER DEVICES IN A SHORT-RANGE WIRELESS BEACON COMMUNICATION SYSTEM

TECHNICAL FIELD

The present invention generally relates to the field of beacon communication systems comprising one or more short-range wireless beacon transmitter devices and one or more short-range wireless beacon receiver devices. More specifically, the invention relates to a short-range wireless beacon communication system with improved ability to trigger beacon receiver devices. The invention also relates to a method of operating such a beacon communication system, and to an associated short-range wireless beacon transmitter device.

BACKGROUND

Short-range wireless beacon transmitter devices are used at various sites, such as shops, restaurants, cultural venues and sport arenas, to attract attention from nearby users of beacon receiver devices in the form of mobile communication devices, such as mobile terminals like smartphones or tablets. The abbreviated notion mobile devices will be used herein when referring to such mobile communication devices. While the beacon receiver devices by nature are mobile, the beacon transmitter devices may be either stationary in the sense that they are installed at fixed locations, or they too may be mobile as will be described in more detail later.

For instance, the iBeacon technology from Apple allows for mobile devices to understand their location on a micro-local scale, and also allows delivery of hyper-contextual content to the users of mobile devices based on their current location. The iBeacon technology is based on the Bluetooth Low Energy (BLE) standard, and more particularly on Generic Access Profile (GAP) advertising packets. There are several other kinds of short-range wireless beacon technologies, for instance AltBeacon, URIBeacon and Eddystone, which are also based on BLE and GAP.

In a basic short-range wireless beacon communication system based on the BLE standard, a beacon transmitter device repeatedly broadcasts a short-range wireless beacon advertisement signal in a 31-byte GAP BLE packet. The beacon advertisement signal contains a 128-bit universally unique identifier, UUID. The beacon advertisement signal may also include a 16-bit major portion and a 16-bit minor portion. The beacon signal identifies a beacon region associated with the beacon transmitter device. Whereas, as is commonly known, a geographical region is an area defined by a circle of a specified radius around a known point on the Earth's surface, a beacon region is in contrast an area defined by a mobile device's proximity to one or more beacon transmitter devices.

In some implementations, the beacon region is represented by the UUID, the major portion and the minor portion in the beacon advertisement signal. In other implementations, the beacon region is represented by the UUID and the major or minor portion in the beacon signal. In still other implementations, the beacon region is represented by the UUID alone.

In some installations, additional beacon transmitter devices may also repeatedly broadcast a short-range wireless beacon signal for the same beacon region as a first beacon transmitter device, using a beacon advertisement signal having the same content.

To be able to receive the short-range wireless beacon signal provided that they are within range of a beacon transmitter device, each mobile device is provided with an application program, app, which is configured to detect and react on short-range wireless beacon signals, such as the aforementioned beacon advertisement signal, with support from the underlying operating system. In one known beacon technology, the apps in mobile devices can detect and react on beacons in two ways, monitoring and ranging. Monitoring enables the app to detect movement in and out of the beacon region (i.e., whether the mobile device is within or outside of the range of any of the beacon transmitter devices with which the beacon region is associated). Hence, monitoring allows the app to scan for beacon regions. Ranging is more granular and provides a list of beacon transmitter devices in range, together with their respective received signal strength, which may be used to estimate a distance to each of them. Hence, ranging allows the app to detect and react on individual beacon transmitter devices in a beacon region.

These apps may be handled by the operating system of the mobile device in different modes. The most prominent mode is the active mode, in which the app executes in the foreground and is typically capable of interacting with the user of the mobile device and also to communicate with an external device such as a server via the short-range wireless beacon interface and/or another communication interface. As regards short-range wireless beacon communication, ranging only works when the app is in active mode.

When a mobile device receives the beacon advertisement signal, the app in the mobile device may detect that it has entered the beacon region from the UUID (and the major/minor as the case may be) contained in the beacon advertisement signal, and react as appropriate in some way which is beneficial to the user and/or the host of the beacon transmitter device and which often involves interaction between the app in the mobile device and a service provider over a broadband communication network. A system server may also be included in some implementations.

Examples of such beneficial use include, without limitation, determining a current approximate position of the mobile device by retrieving a predefined position of the beacon transmitter device from the service provider or by cross reference with local lookup data, or retrieving content from the service provider.

A mobile device where the app is in active mode is referred to as an active mobile device in this document. An active mobile device may receive and react to additional transmissions of the beacon advertisement signal from the beacon transmitter device; this may be useful for instance if the content associated with the host of the beacon transmitter device is updated or changed.

Furthermore, an active mobile device may receive and react to beacon advertisement signals from other beacon transmitter devices nearby, provided of course that they are within range of the respective beacon transmitter device, or move closer to it. This is so irrespective of whether the different beacon transmitter devices advertise the same beacon region (i.e. contain the same UUID and major/minor in the respective beacon advertisement signals), or different beacon regions (provided that the app is configured to monitor for such different beacon regions). It is to be noticed that the same beacon region (e.g. same UUID) is very often used for different beacon transmitter devices hosted by the same host, such as within the same supermarket, arena, fastfood restaurant, etc.

The operating system of the mobile devices may also handle apps in a passive mode. A purpose of the passive mode is power preservation, since the mobile devices are typically powered by batteries and since it is a general technical ambition to maximize the operational time of a mobile device between successive charging sessions. In the passive mode, the app executes in the background or is only installed on the mobile device. Unlike ranging which only works when the app is in active mode, monitoring works when the app is in active mode as well as when the app is in passive mode.

Transitions between active mode and passive mode may be based on user interaction, user preference settings in the app or the operating system, or program logic in the app or the operating system.

A mobile device where the app is in passive mode is referred to as a passive mobile device in this document. In the passive mode, the app typically cannot interact with the user via the user interface, nor communicate with a server or another device—except for the following. Just like active mobile devices, a nearby passive mobile device may monitor for a beacon region and hence receive a short-range wireless beacon advertisement signal if it is within range of the beacon transmitter device in question. However, unlike active mobile devices, after a short beacon scanning period in the monitoring, during which the beacon transmitter device is discoverable and also communication with a server or another device is possible, and unless it switches to active mode, the passive mobile device will not be able to react to additional beacon advertisement signals for the same beacon region from the beacon transmitter device.

Instead, after the short beacon scanning period (which typically lasts for some seconds, such as about 10 seconds), the passive mobile device will be "ignorant" or "deaf to", i.e. not react on, additional beacon advertisement signals for the same beacon region for as long as it stays in passive mode and continues to detect such beacon advertisement signals, for instance because it remains within range of the beacon transmitter device and continues to detect its beacon advertisement signal. Such a "deafened out" state will last for a certain time, which in a typical prior art implementation is at least 30 seconds to avoid false positives due to effects in the radio signal environment (e.g. multi-propagation delay). The "deafened out" state may however often last substantially longer than 30 seconds, sometimes as long as about 15 minutes depending on operational factors such as, for instance, battery level, power consumption or operating system scheduling in the passive mobile device. Only once the passive mobile device has not received the beacon advertisement signal, or any other beacon communication which advertises the same beacon region, for a certain time, such as 1-15 minutes, the passive mobile device will again be reactive to the beacon advertisement signal, or any other beacon communication which advertises the same beacon region.

The present inventors have identified challenges associated with passive mobile devices as referred to above.

It is a problem for the host of the beacon transmitter device, since it will prevent the host from advertising for new or updated content. It is also a problem to the passive mobile device, since it will be deprived of an opportunity to react on the beacon advertisement signal during the period when it is "deafened out".

This also means that when there are several beacon transmitter devices in the beacon region, a passive mobile device will be locked to the beacon transmitter device which it first discovered in the beacon region for as long as it stays within range of that beacon transmitter device's beacon signal. This is, again, problematic both from the point of view of the passive mobile device itself and for the host of the beacon transmitter devices, for the reasons explained above. In addition to this, the host of the beacon transmitter devices will not be able to track the movement of the passive mobile device and broadcast an adapted service offer to the user of the passive mobile device as a result of the movement (such as, for instance, offering a first content when the user is in a first subarea where a first beacon transmitter device is located and a different, second content when the user is in a second subarea where a second beacon transmitter device is located).

Moreover, when the mobile device app uses beacon-based localization functionality for the purpose of determining the location of the user with a high degree of accuracy by means of triangulation based on several stationary beacon transmitter devices covering the same beacon region, for instance indoors, there might be a problem if the mobile device is in passive mode. A passive mobile device will not be able to update its estimated location caused by the movement, since the second beacon transmitter device will not be detected when the passive mobile device is still within range of the first beacon transmitter device.

In recent time, applications have been introduced which are based on mobile beacon transmitter devices rather than stationary. For instance, the present applicant has taken leadership in developing a new beacon-based technology which considerably facilitates for users of mobile devices which are proximate to each other to interact by, for instance, sharing content or conducting social media interaction.

The technology, which can be referred to as a "bubble" concept, is based on short-range wireless beacon broadcast messaging for establishing a dynamic, proximity-based network. Interaction between the users of the mobile devices in the network is supported by broadband network communication with a server. A short-range wireless beacon system based on mobile beacon transmitter devices is shown in FIG. 3A. While it can generally be used for various different purposes, the system in FIG. 3A is advantageously used for implementing the above-mentioned bubble concept. To this end, each mobile device $A_1, A_2, A_3, A_4, P_1$ is provided with an app which (together with the operating system and hardware in the mobile device) is configured to handle transmission as well as reception of short-range wireless beacon signals. Hence, unlike a basic static beacon communication system, in the bubble system of FIG. 3A, each mobile device can act as a beacon transmitting device as well as a beacon receiving device. In FIG. 3A, the mobile device $A_1$ is in active mode and repeatedly broadcasts its short-range wireless beacon advertisement signal BA, containing a 128-bit universally unique identifier UUID as well as a device identifier within the 32-bit major/minor portion of the beacon signal.

Other active mobile devices $A_2, A_3, A_4$ within a proximity zone (range) of the mobile device $A_1$ can receive the beacon advertisement signal BA, read the UUID and the device identifier, and as a result contact a system server SS over a broadband communication network (NW) 300. The app in the receiving mobile device may decide, for instance based on user interaction, user preference settings and/or program logic in the app, to join the bubble of the mobile device $A_1$, wherein the system server SS will register the receiving mobile device as belonging to the bubble of the mobile device $A_1$. Hence, the beacon advertisement signal BA from the mobile device $A_1$ serves for announcing to the mobile devices $A_2$, $A_3$, $A_4$ in the proximity of the mobile device $A_1$ about the availability of a dynamic ad-hoc network $PZ_1$ of beacon transmitter devices, i.e. the bubble which the short-range wireless beacon transmitter device $A_1$ is a member of.

The users of the bubble members $A_1$-$A_4$ may then, for instance, share content or conduct social media interaction supported by the system server SS and/or a service provider SP over the broadband communication network 300.

There may also be passive mobile devices within the proximity zone of the active mobile device $A_1$. This is seen for a passive mobile device $P_1$ in FIG. 3A. The passive mobile device $P_1$ will also receive the beacon signal BA as identified by the UUID. However, if the mobile device $P_1$ remains in passive mode, it will not be able to react to additional transmissions of the beacon signal BA from the active mobile device $A_1$ for the reasons explained above. The passive mobile device $P_1$ will therefore not be reactive to additional transmissions of the beacon signal BA from the active mobile device $A_1$ during the "deafened out" state.

This problematic situation is complicated further by the fact that in a bubble system, all active mobile devices are potential senders as well as receivers of beacon signals. For instance, the other active mobile devices $A_2$, $A_3$ and $A_4$ may also send respective beacon advertisement signals to generate a respective bubble (dynamic ad-hoc network) of nearby mobile devices within their respective proximity zones. These transmissions typically use the same common UUID, wherein the transmissions are individualized by including a respective device identifier within the 32-bit major/minor portion of the respective beacon signal.

While the active mobile devices $A_1$, $A_2$ and $A_3$ (for example) may react to the beacon advertisement signal and hence join the bubble of the active mobile device $A_4$ (for example), this is not so for the passive mobile device $P_1$ if it has already have detected the beacon advertisement signal of the first active mobile device $A_1$ (for example) and thus been deafened out.

A problem from the point of view of the passive mobile device $P_1$ is that it will not have any opportunity to hear the beacon advertisement signals as identified by the common UUID and as a result not be given any opportunity to join other bubbles than the bubble of the first active mobile device $A_1$ (for example). A problem from the point of view of the active mobile devices $A_2$, $A_3$ and $A_4$ is correspondingly that they will not be aware of the presence of the passive mobile device $P_1$ within their respective proximity zones, nor be able to announce their availability as bubble creators to the passive mobile device $P_1$.

As is clear from the above description, the present inventors have identified several problems with beacon communications systems of the prior art. In addition to the observations above, the present inventors have also identified a need for improved triggering of beacon receiver devices in beacon communications systems to cause an individual beacon receiver device or a group of beacon receiver devices to perform an action.

SUMMARY

It is accordingly an object of the invention to offer improvements in the technical field of short-range wireless beacon communication systems, and to solve, eliminate, alleviate, mitigate or reduce at least some of the problems referred to above.

One aspect of the present invention is a beacon communication system comprising a short-range wireless beacon transmitter device and a short-range wireless beacon receiver device.

The short-range wireless beacon transmitter device is configured to repeatedly transmit a short-range wireless beacon advertisement signal on a first beacon broadcast channel, the first beacon broadcast channel being defined by a predefined unique identity included in the short-range wireless beacon advertisement signal, the predefined unique identity remaining fixed between subsequent transmissions of the short-range wireless beacon advertisement signal.

The short-range wireless beacon transmitter device is furthermore configured to temporarily transmit a short-range wireless beacon trigger signal on an alternate beacon broadcast channel, the alternate beacon broadcast channel being defined by a dynamically allocated unique identity included in the short-range wireless beacon trigger signal, the dynamically allocated unique identity being different from the predefined unique identity and being different between subsequent transmissions of the short-range wireless beacon trigger signal.

Hence, a beacon communication system with improved ability to trigger beacon receiver devices has been provided.

Another aspect of the present invention is a method of operating a beacon communication system which comprises a short-range wireless beacon transmitter device and a short-range wireless beacon receiver device.

The method involves repeatedly transmitting, by the short-range wireless beacon transmitter device, a short-range wireless beacon advertisement signal on a first beacon broadcast channel, the first beacon broadcast channel being defined by a predefined unique identity included in the short-range wireless beacon advertisement signal, the predefined unique identity remaining fixed between subsequent transmissions of the short-range wireless beacon advertisement signal.

The method also involves temporarily transmitting, by the short-range wireless beacon transmitter device, a short-range wireless beacon trigger signal on an alternate beacon broadcast channel, the alternate beacon broadcast channel being defined by a dynamically allocated unique identity included in the short-range wireless beacon trigger signal, the dynamically allocated unique identity being different from the predefined unique identity and being different between subsequent transmissions of the short-range wireless beacon trigger signal.

Accordingly, a method of operating a beacon communication system with improved ability to trigger beacon receiver devices has been provided.

Still another aspect of the present invention is a short-range wireless beacon transmitter device for use in a beacon communication system which furthermore comprises a short-range wireless beacon receiver device.

The short-range wireless beacon transmitter device is configured to repeatedly transmit a short-range wireless beacon advertisement signal on a first beacon broadcast channel, the first beacon broadcast channel being defined by a predefined unique identity included in the short-range wireless beacon advertisement signal, the predefined unique identity remaining fixed between subsequent transmissions of the short-range wireless beacon advertisement signal.

The short-range wireless beacon transmitter device is moreover configured to temporarily transmit a short-range wireless beacon trigger signal on an alternate beacon broadcast channel, the alternate beacon broadcast channel being defined by a dynamically allocated unique identity included in the short-range wireless beacon trigger signal, the dynamically allocated unique identity being different from the predefined unique identity and being different between subsequent transmissions of the short-range wireless beacon trigger signal.

As a result, a short-range wireless beacon transmitter device suitable for use in a beacon communication system with improved ability to trigger beacon receiver devices has been provided.

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

FIGS. 3A-3F are illustrations of a chain of activities occurring in a beacon communication system generally designed according to one embodiment of the system in FIGS. 1A and 1B.

FIG. 5 illustrates a general method according to the invention of operating a short-range wireless beacon communication system with improved ability to trigger beacon receiver devices.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
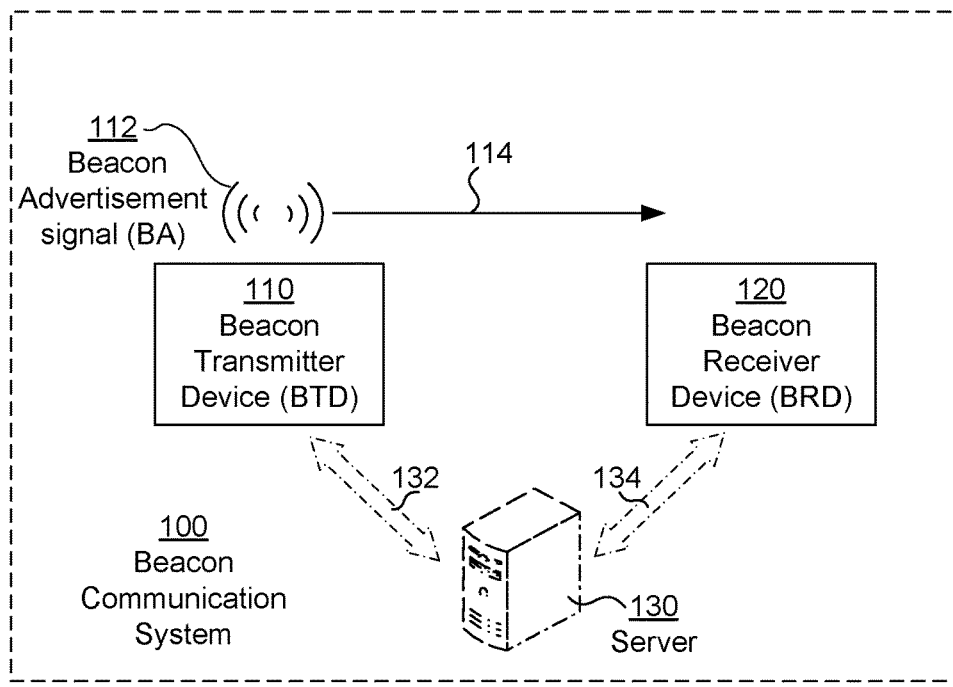
FIG. 1A illustrates a short-range wireless beacon system having a short-range wireless beacon transmitter device and a short-range wireless beacon receiver device, wherein the beacon transmitter device is configured to repeatedly transmit a short-range wireless beacon advertisement signal on a first beacon broadcast channel.

Reference is made to FIG. 1A that illustrates a short-range wireless beacon communication system 100 having a short-range wireless beacon transmitter device 110 and a short-range wireless beacon receiver device 120. The beacon transmitter device 100 is configured to repeatedly transmit a short-range wireless beacon advertisement signal BA 112 on a first beacon broadcast channel 114.

Figure 2:
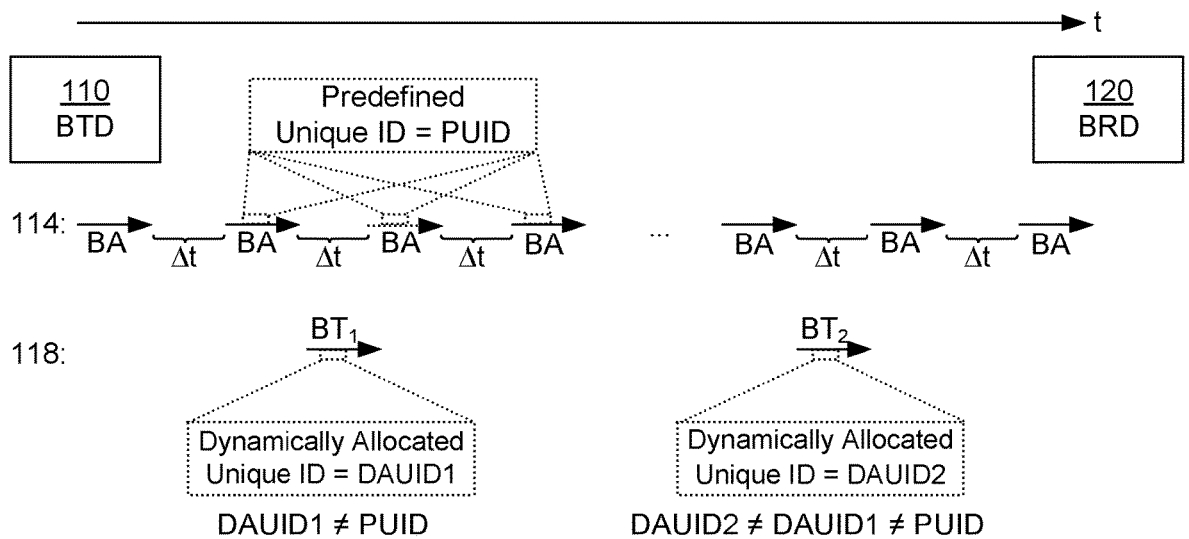
FIG. 2 is a schematic timing diagram illustrating the repeated transmission of the short-range wireless beacon advertisement signal on the first beacon broadcast channel according to FIG. 1A and the temporary transmission of the short-range wireless beacon trigger signal on the alternate beacon broadcast channel according to FIG. 1B.

As is seen in FIG. 2, this typically occurs at a certain periodicity with a short time Δt between each transmission of the beacon advertisement signal BA 112, where the time Δt between successive transmissions of the beacon advertisement signal BA 112 may typically be in the order of 1 second (other time values are of course also possible). The first beacon broadcast channel 114 is defined by a predefined unique identity (PUID) which is included in the short-range wireless beacon advertisement signal BA 112. The predefined unique identity PUID remains fixed between subsequent transmissions of the short-range wireless beacon advertisement signal BA 112. The predefined unique identity PUID may typically represent a universally unique identifier (UUID) value.

The short-range wireless beacon system 100 also preferably comprises a server 130, which is only schematically indicated in FIG. 1A. As will be clear from the description of the remaining drawings, the short-range wireless beacon transmitter device 110 and the short-range wireless beacon receiver device 120 may interact 132, 134 with the server 130.

The operation of the beacon communication system 100 as described above may be essentially the same as for a beacon communication system according to the description in the background section above. This part of the operation is summarized in a step 510 in FIG. 5.

Figure 1B:
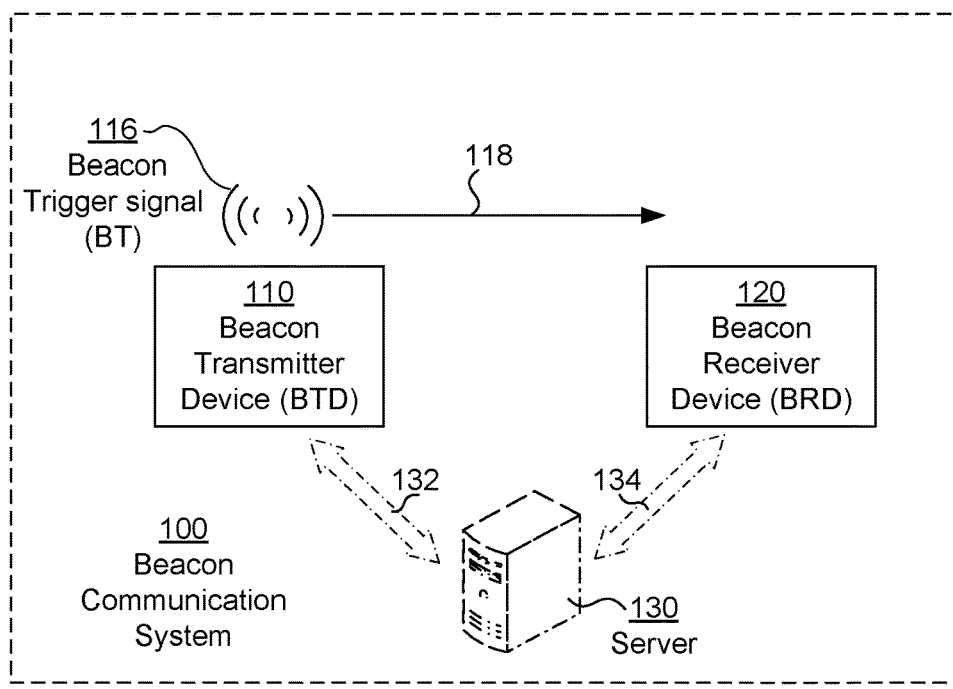
FIG. 1B illustrates the short-range wireless beacon communication system of FIG. 1A, wherein the beacon transmitter device is furthermore configured to temporarily transmit a short-range wireless beacon trigger signal on an alternate beacon broadcast channel.

In addition to this, and as seen in FIG. 1B and FIG. 2, the beacon communication system 100 comprises novel and inventive functionality as follows. Also see steps 520 and 530 in FIG. 5.

In order to improve the ability to trigger the short-range wireless beacon receiver device 120, the short-range wireless beacon transmitter device 110 is configured to temporarily transmit a short-range wireless beacon trigger signal BT 116 on an alternate beacon broadcast channel 118. The alternate beacon broadcast channel is defined by a dynamically allocated unique identity (DAUID) which is included in the short-range wireless beacon trigger signal BT 116 as seen in FIG. 2. The dynamically allocated unique identity DAUID is different from the predefined unique identity PUID. Moreover, the dynamically allocated unique identity DAUID is also different between subsequent transmissions of the short-range wireless beacon trigger signal BT 116.

More specifically, as seen in FIG. 2, the short-range wireless beacon transmitter device 110 is configured to temporarily transmit the short-range wireless beacon trigger signal $BT_1$ 116 on the alternate beacon broadcast channel 118 at a single occasion with a first value DAUID1 of the dynamically allocated unique identity. As will be described in more detail below, the purpose of the short-range wireless beacon trigger signal 116 is to cause the receiving short-range wireless beacon receiver device 120 to perform an activity 530.

The next time it is desired to cause the receiving short-range wireless beacon receiver device 120 to perform an activity 530, the short-range wireless beacon transmitter device 110 will temporarily transmit the short-range wireless beacon trigger signal $BT_2$ 116 on the alternate beacon broadcast channel 118, again at a single occasion but with a second value DAUID2 of the dynamically allocated unique identity. Hence, the first and second values DAUID1 and DAUID2 of the dynamically allocated unique identity which defines the alternate beacon broadcast channel 118 for the short-range wireless beacon trigger signal $BT_1/BT_2$ 116 will be different from each other and also from the fixed predefined unique identity PUID which defines the first beacon broadcast channel 114 for the short-range wireless beacon advertisement signal BA 112. Each value DAUID1 and DAUID2 of the dynamically allocated unique identity will typically only be used once, hence being temporary in contrast to the repeated use of the predefined unique identity PUID.

The use of, on the one hand, a fixed predefined unique identity PUID to define the first beacon broadcast channel 114 for the short-range wireless beacon advertisement signal BA 112 and, on the other hand, a dynamically allocated unique identity DAUID1, DAUID2 to define the alternate beacon broadcast channel 118 for the short-range wireless beacon trigger signal 116, is particularly advantageous.

This is so since it will maintain the ability of the short-range wireless beacon advertisement signal BA 112 to cause short-range wireless beacon receiver devices in proximity of the short-range wireless beacon transmitter device 110 to register their presence (for instance by contacting 134 the server 130), like in a beacon communication system according to the description in the background section above. The fixed predefined unique identity PUID will then be registered in the apps of the short-range wireless beacon receiver devices and allow them to monitor for the fixed predefined unique identity PUID and hence discover short-range wireless beacon transmitter devices using this predefined unique identity PUID in their beacon advertisement signals BA.

At the same time, the use of PUID as well as DAUID1/DAUID2 in the beacon communication system 100 will also allow improved triggering of the wireless beacon receiver device 120 when it is in passive mode, and/or allow selective triggering of individual wireless beacon receiver devices or groups of such devices in the beacon communication system 100.

In one embodiment, the dynamically allocated unique identity DAUID1/DAUID2 included in the short-range wireless beacon trigger signal $BT_1/BT_2$ 116 is adapted to be received by said short-range wireless beacon receiver device 120 but not by other short-range wireless beacon receiver devices in proximity of the short-range wireless beacon transmitter device 110.

In another embodiment, the dynamically allocated unique identity DAUID1/DAUID2 included in the short-range wireless beacon trigger signal $BT_1/BT_2$ 116 is adapted to be received by all short-range wireless beacon receiver devices, including the short-range wireless beacon receiver device 120, in proximity of the short-range wireless beacon transmitter device 110.

In still another embodiment, the dynamically allocated unique identity DAUID1/DAUID2 included in the short-range wireless beacon trigger signal $BT_1/BT_2$ 116 is adapted to be received by a subset of all short-range wireless beacon receiver devices in proximity of the short-range wireless beacon transmitter device 110, wherein the subset includes the short-range wireless beacon receiver device 120.

Reference is now made to FIGS. 3A-3F which are illustrations of a chain of activities occurring in a beacon communication system 100' as one exemplifying embodiment of the general beacon communication system 100 in FIGS. 1A and 1B.

Figure 3A:
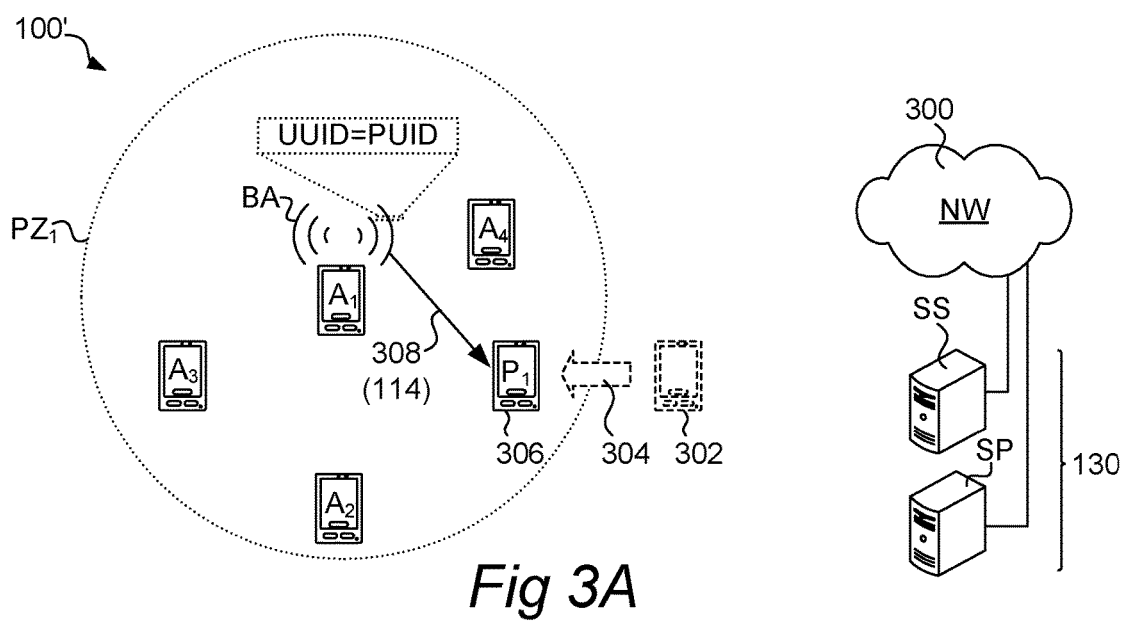

Starting with FIG. 3A, as was mentioned already in the description of the background section above, the system 100 is advantageously used for implementing the above-mentioned bubble concept, i.e. the formation of a dynamic ad-hoc network $PZ_1$ of mobile devices $A_1, A_2, A_3, A_4$ and $P_1$ in proximity of the mobile device $A_1$. In the bubble system of FIG. 3A, each mobile device can act as a beacon transmitting device as well as a beacon receiving device. In FIG. 3A, the mobile device $A_1$ is in active mode and repeatedly broadcasts its short-range wireless beacon advertisement signal BA, containing a 128-bit universally unique identifier UUID=PUID as well as a device identifier within the 32-bit major/minor portion of the beacon signal.

The other active mobile devices $A_2, A_3, A_4$ within the proximity zone (range) of the mobile device $A_1$ can receive the beacon advertisement signal BA, read the UUID=PUID and the device identifier, and as a result contact the system server SS over the broadband communication network 300. The app in the receiving mobile device may decide, for instance based on user interaction, user preference settings and/or program logic in the app, to join the bubble of the mobile device $A_1$, wherein the system server SS will register the receiving mobile device as belonging to the bubble of the mobile device $A_1$.

Hence, the beacon advertisement signal BA from the mobile device $A_1$ serves for announcing to the mobile devices $A_2, A_3, A_4$ in the proximity of the mobile device $A_1$ about the availability of the dynamic ad-hoc network $PZ_1$ of beacon transmitter devices, i.e. the bubble which the short-range wireless beacon transmitter device $A_1$ is a member of. In other words, the short-range wireless beacon advertisement signal BA is adapted for causing short-range wireless beacon receiver devices $A_2$-$A_4$ in proximity of the short-range wireless beacon transmitter device $A_1$ to contact the server SS 130 over the broadband network 300 to register their presence in the proximity of the short-range wireless beacon transmitter device $A_1$.

As seen in FIG. 3A, a passive mobile device $P_1$ may also be reached 308 by the beacon advertisement signal BA from the mobile device $A_1$ when the passive mobile device $P_1$ approaches the proximity zone of the mobile device $A_1$, as seen at 302-306.

Figure 3B:
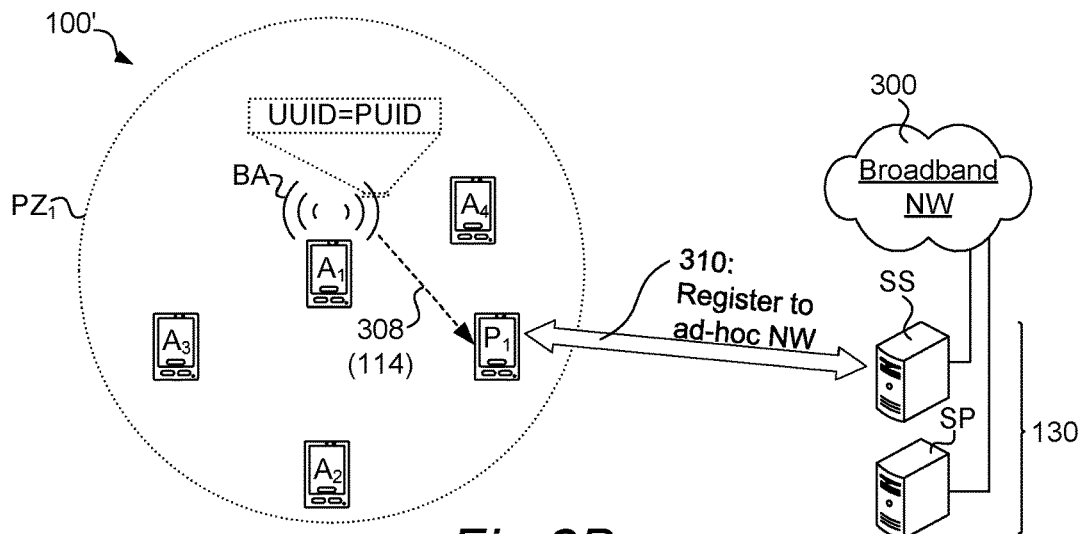

In response, just like the active mobile devices $A_2, A_3, A_4$ and as seen in FIG. 3B, the passive mobile device $P_1$ may contact 310 the server SS 130 over the broadband network 300 to register its presence in the proximity of the mobile device $A_1$ and join the dynamic ad-hoc network $PZ_1$ (i.e. the bubble) around the mobile device $A_1$. As seen at 312 in FIG. 3C, in order to avoid a "deafening out" problem with the passive mobile device $P_1$ as described in the background section, the dynamically allocated unique identity will be set to a first value DAUID1 which is different from the predefined unique identity PUID used in the beacon advertisement signal BA of the mobile device $A_1$ (and which will also be different from subsequently generated versions of the dynamically allocated unique identity, cf second value DAUID2 for the second temporary transmission of the short-range wireless beacon trigger signal $BT_2$ 116 on the alternate beacon broadcast channel 118 in the description of FIG. 2).

The activity in step 312 occurs between the server SS and the passive mobile device $P_1$, and the initiative may be the server's SS or the passive mobile device's $P_1$, depending on implementation.

As a result, the app in the passive mobile device $P_1$ will add the UUID=DAUID1 to the list of UUID:s to monitor for. The dynamically allocated unique identity DAUID1 is generated by the server SS, for instance by using a predefined storage of unique and hitherto unused UUID:s and setting the dynamically allocated unique identity to one of these values, namely DAUID1, or by using a random number generator, etc. The server SS may either generate the dynamically allocated unique identity DAUID1 "from scratch" or by using some kind of seed received from or otherwise associated with the passive mobile device $P_1$ (based, for instance, on a unique identity of the passive mobile device $P_1$, like the aforementioned device identifier, a MAC address, etc).

Figure 3C:
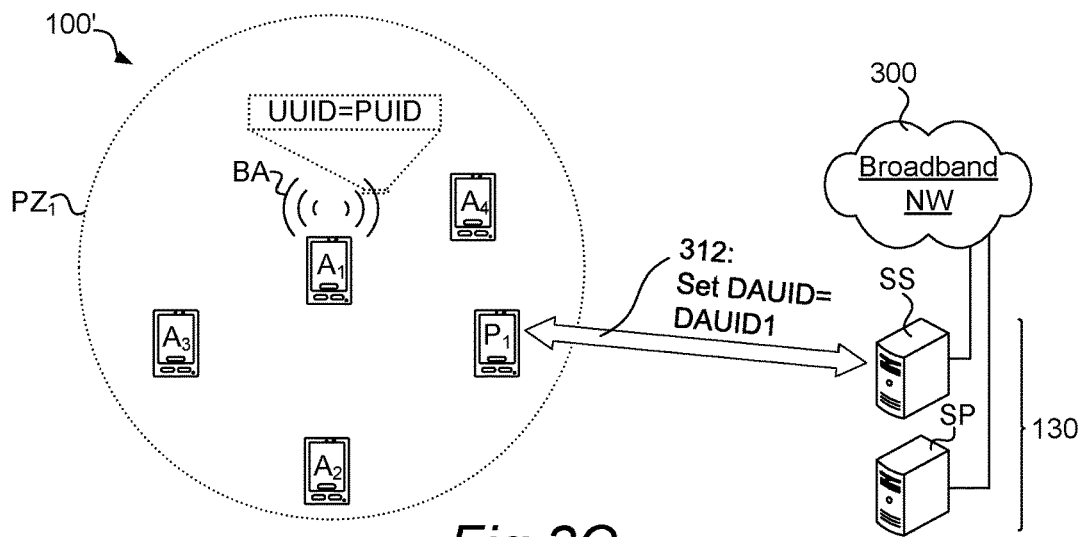
Figure 3D:
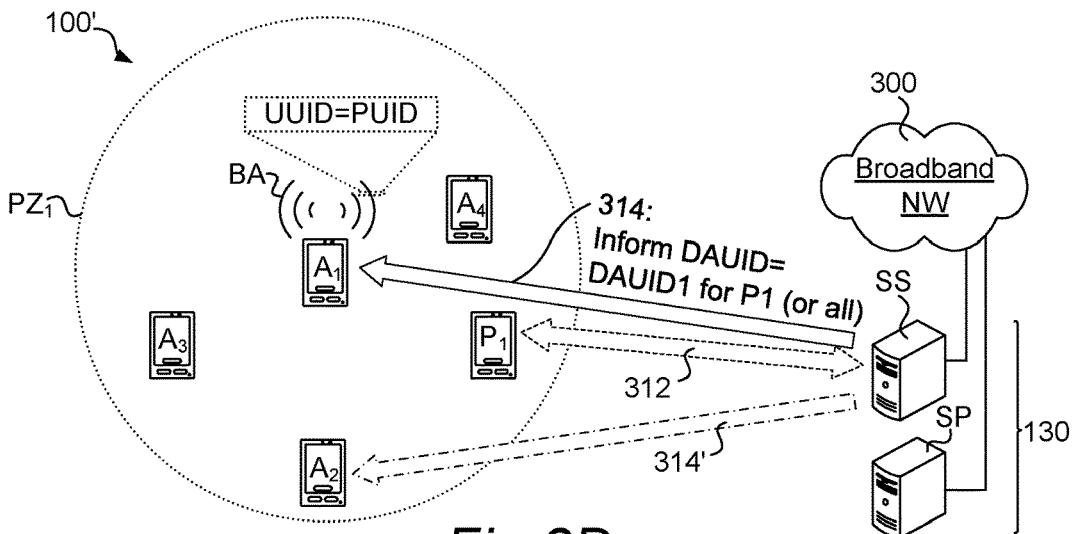

As seen at 314 in FIG. 3D, information about the generated dynamically allocated unique identity DAUID1 is communicated by the server SS to the mobile device $A_1$ over the broadband network 300. The mobile device $A_1$ receives the information 314 about the generated dynamically allocated unique identity DAUID1 and records that the next time it is desired to reach contact with the passive mobile device $P_1$ over the beacon signal interface, it shall be done in the form of the beacon trigger signal $BT_1$ on the alternate beacon broadcast channel 118, as defined by the dynamically allocated unique identity DAUID1. This is seen at 316 in FIG. 3E.

In some embodiments, as already indicated above, the generated dynamically allocated unique identity DAUID1 may be intended for and therefore common to all receiver mobile devices $A_2$, $A_3$, $A_4$, $P_1$ in the system 100', or to a subset of them. In such embodiments, the server SS accordingly informs all relevant receiver mobile devices (illustrated by mobile device $A_2$ in FIG. 3D; see 314') about the generated dynamically allocated unique identity DAUID1.

As seen in FIG. 3E, the next time it is desired to reach contact with the passive mobile device $P_1$ over the beacon signal interface, the mobile device $A_1$ will use the recorded information about the generated dynamically allocated unique identity DAUID1 and set the UUID of the beacon trigger signal $BT_1$ on the alternate beacon broadcast channel 118 to the retrieved value DAUID1.

As seen in FIGS. 3E and 3F, the beacon trigger signal $BT_1$ containing the UUID=DAUID1 may be received 316 and heard by the passive mobile device $P_1$, since it is a dynamically allocated UUID monitored for in the app of the passive mobile device $P_1$ but not hitherto used (i.e., no resulting "deafening out" situation). The short-range wireless beacon trigger signal $BT_1$ is adapted for causing the short-range wireless beacon receiver device $P_1$ to perform an activity 530, which in the present embodiment may include causing the passive mobile device $P_1$, when being in its passive mode, to enter into its short-range wireless beacon scanning mode. As a result, the passive mobile device $P_1$ may react 318 by contacting the server SS or a service provider 318a, or one of the other mobile devices in the system 100' as seen at 318b. The reaction 318, 318a, 318b may either be the direct consequence of having heard the beacon trigger signal $BT_1$, or the indirect consequence of reception of the beacon trigger signal $BT_1$ awakening the passive mobile device $P_1$ from its passive mode and therefore again being capable of receiving and hearing a subsequent transmission of the beacon advertisement signal BA with its UUID=PUID.

In embodiments where, as already discussed, the generated dynamically allocated unique identity DAUID1 is intended for and therefore common to all receiver mobile devices $A_2$, $A_3$, $A_4$, $P_1$ in the system 100', or to a subset of them, also such other device(s) may of course react 318c to the reception 316' of the beacon trigger signal $BT_1$ containing the UUID=DAUID1 (illustrated for the mobile device $A_2$) in FIG. 3F.

In an alternative embodiment, information about the dynamically allocated unique identity DAUID1 generated by the server SS is communicated by the server SS to the short-range wireless beacon transmitter device (e.g. the transmitting mobile device $A_1$, like in step 314 in FIG. 3D), but not to the short-range wireless beacon receiver device (e.g. the receiving passive mobile device $P_1$, unlike step 312 in FIG. 3C). In this alternative embodiment, the transmitting mobile device $A_1$ will instead in turn communicate the dynamically allocated unique identity DAUID1 to the receiving passive mobile device $P_1$ in a short-range wireless beacon signal.

In some embodiments, the short-range wireless beacon transmitter device (e.g. the transmitting mobile device $A_1$) is configured to detect an event in the beacon communication system 100; 100' and in response send a request over the broadband network 300 to the server SS 130 to cause the server SS 130 to generate the dynamically allocated unique identity DAUID1 or DAUID2 (e.g. to initiate the activity 312 in FIG. 3C).

Such an event may, for instance, be related to a request for authentication by another short-range wireless beacon receiver device (e.g. $A_2$-$A_4$) in proximity of the short-range wireless beacon transmitter device (e.g. $A_1$). Other examples are also conceivable, as is realized by a skilled person. From this also follows that embodiments of the present invention may be applicable not only to passive mobile devices but also to various kinds of short-range wireless beacon receiver devices, including active mobile devices.

Another example of an event which may initiate the generation of the dynamically allocated unique identity DAUID1 or DAUID can be an event related to a service offered by a service terminal associated with the short-range wireless beacon transmitter device 110. One example of a relevant beacon communication system 100" for this example is seen in FIG. 4.

Figure 4:
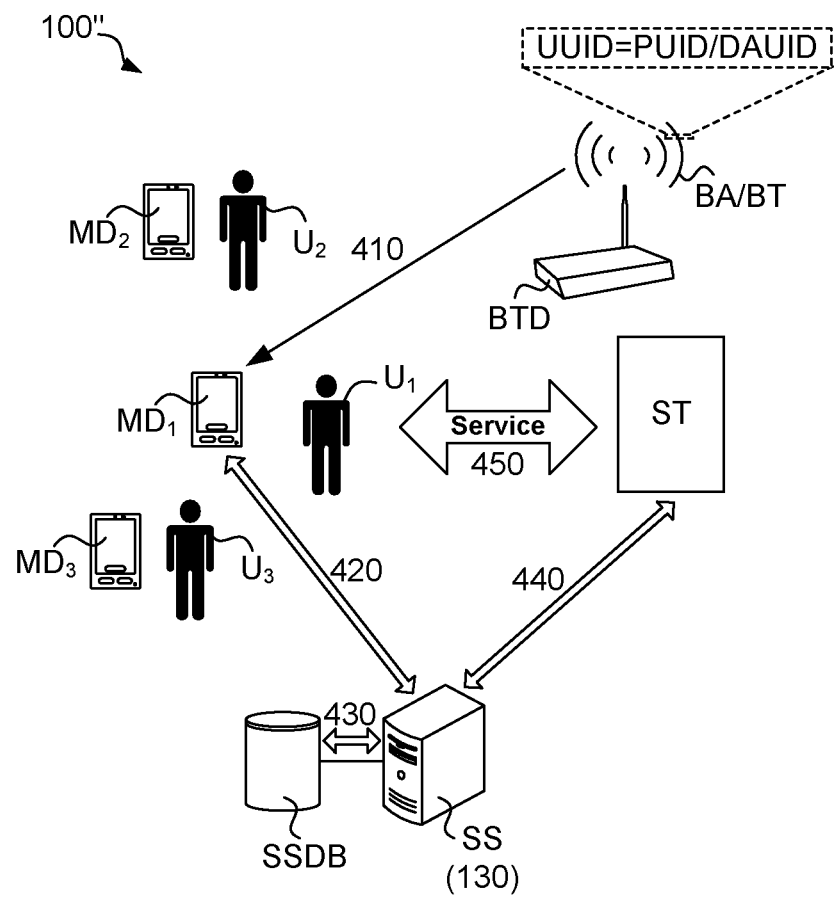
FIG. 4 is an illustration of a chain of events occurring in a beacon communication system generally designed according to another embodiment of the system in FIGS. 1A and 1B.

A beacon communication system 100" for providing a service by a service terminal ST to users $U_1$, $U_2$, $U_3$ of mobile devices $MD_1$, $MD_2$, $MD_3$ is shown in FIG. 4. The service may, for instance, involve a monetary transaction to be performed for a purchase at, for instance, a shop, restaurant, cultural venue or sport arena. The service terminal ST may then, for instance, be a point-of-sales terminal, cash register or ticket desk. This scenario will be used as a non-limiting example for the following description.

The beacon communication system 100" also comprises a system server SS and a short-range wireless beacon transmitter device BTD. The beacon transmitter device BTD may be a stationary (static-location) beacon transmitter device, or a mobile beacon transmitter device for instance in the form of a mobile device which is enabled for beacon communication. Even though shown as separate devices in FIG. 1, the wireless beacon transmitter device BTD and the service terminal ST may be implemented by one and the same physical device, such as a tablet computer, in some embodiments.

A service may be provided by the service terminal ST as follows.

First, the beacon transmitter device BTD sends 410 a beacon advertisement signal BA 112 as previously discussed. If any of the mobile devices $MD_1$, $MD_2$, $MD_3$ are near the beacon transmitter device BTD, i.e. within the beacon region, it may receive the beacon advertisement signal BA 112.

As a result, the receiving mobile device $MD_1$ may report to the system server SS that it has received the beacon advertisement signal BA 112. This is seen at 420 in FIG. 4. This report is also known as an "entry" event with respect to the beacon region identified in the beacon advertisement signal BA 112. The report includes a received signal strength (e.g. RSSI, Received Signal Strength Indicator) of the beacon advertisement signal BA 112 as received at the mobile device $MD_1$. The received signal strength may for instance, be expressed as a relative power value in dBm and may typically be obtained by the aforementioned ranging functionality.

At 430 in FIG. 4, the system server SS registers the report from the mobile device $MD_1$. The registration may be made in a database SSDB in or associated with the system server SS. In some embodiments, the registration 430 is made by updating a mobile device record which is kept in the database SSDB and is associated with the mobile device $MD_1$, the user $U_1$, or both. The registration may include making a note in the mobile device record that the mobile device $MD_1$ has now entered the beacon region, together with a note of the current date and time, and the RSSI.

The procedure above may be repeated each time the mobile device $MD_1$ is capable of receiving the repeatedly transmitted beacon advertisement signal BA 112 and reacting by reporting the respective receptions to the system server SS.

Thanks to the detection of the appearing mobile device $MD_1$ through the beacon signaling and the subsequent reporting to and registration by the system server SS, the service terminal ST may initiate a service to the user $U_1$ of the mobile device $MD_1$ without requiring the user $U_1$ of the mobile device $MD_1$ to interact with the user interface of the mobile device to make this initiative (as is the case in typical prior art e-wallet solutions). This is so, since the service terminal ST may communicate with the system server SS, see 440 in FIG. 4, and be informed not only of the presence of the mobile device $MD_1$ in the beacon region associated with the service terminal ST, but in addition also of an estimated distance between the service terminal ST and the mobile device $MD_1$. A beacon-triggered, distance-based provision of service to the user $U_1$ is therefore made possible, as will now be described in more detail.

As already mentioned, the service terminal ST communicates with the system server SS in step 440 in FIG. 4. As a result of the communication, the system server SS obtains an estimated distance between the service terminal ST and the mobile device $MD_1$. This distance may be obtained in different ways. For instance, the system server SS may retrieve the received signal strength registered in the mobile device record upon the mobile device's reporting in steps 420-430, and convert it into a distance with respect to the location of the beacon transmitter device BTD. If the beacon transmitter device BTD is placed at or immediately near the service terminal ST, the converted distance may be used directly as the estimated distance between the service terminal ST and the mobile device $MD_1$. In cases where the beacon transmitter device BTD is not placed at or immediately near the service terminal ST, the converted distance may be combined with a known relative distance between the service terminal ST and the beacon transmitter device BTD to obtain the estimated distance between the service terminal ST and the mobile device $MD_1$.

In some implementations, the system server SS may convert the received signal strength values into distance values already at the registration step 430. In other implementations, the system server SS may send received signal strength values to the service terminal ST in the communication step 440, wherein the service terminal ST will itself make the necessary conversion and calculations to obtain the estimated distance between the service terminal ST and the mobile device $MD_1$.

In step 450 of FIG. 4, the service terminal ST provides the service to the user $U_1$ based on the obtained estimated distance. The obtained estimated distance may be used to control whether or not the provision of the service to the user $U_1$ shall be initiated. Hence, the service terminal ST may check the obtained estimated distance between the service terminal ST and the mobile device $MD_1$, and initiate the service only when the estimated distance meets a threshold criterion.

In one embodiment, the threshold criterion is that the estimated distance between the service terminal ST and the mobile device $MD_1$ is less than a distance between the service terminal ST and another mobile device $MD_2$ or $MD_3$. A rationale for this decision is that the service shall only be initiated to the nearest mobile device user in a first-come-first-served fashion representing a queue of customers at the service terminal ST.

In another embodiment, the threshold criterion is that the estimated distance between the service terminal ST and the mobile device $MD_1$ is less than a certain distance, such as for instance 1 meter, 2 meters, etc. A rationale for this decision is that the service to the user $U_1$ shall only be initiated when the user $U_1$ is sufficiently near the service terminal ST; if the user $U_1$ is strolling around in for instance a shop, the service shall not be initiated until the user U (as evidenced by the mobile device $MD_1$) has approached the point-of sales terminal/cash register/ticket desk, etc.

In an alternative embodiment, the dynamically allocated unique identity DAUID1; DAUID2 is not generated by the server 130; SS but by the short-range wireless beacon transmitter device 110; A1; BTD itself. The details of the generation may be the same as has been previously described for the server case. The generated dynamically allocated unique identity DAUID1; DAUID2 is communicated by the short-range wireless beacon transmitter device 110; A1; BTD to the short-range wireless beacon receiver device 120; P1; MD1 in a short-range wireless beacon signal. For instance, the beacon transmitter device 110; A1; BTD may include the next dynamically allocated unique identity DAUID2 to be used in the payload of the short-range wireless beacon trigger signal 116; $BT_1$; $BT_2$ containing the current dynamically allocated unique identity DAUID1. Alternatively, the beacon transmitter device 110; A1; BTD may include the next dynamically allocated unique identity DAUID1; DAUID2 to be used in the payload of the short-range wireless beacon advertisement signal 112; BA.

In some embodiments, a beacon receiver device $A_2$-$A_4$, $P_1$; $MD_1$-$MD_3$ may receive the next dynamically allocated unique identity DAUID1, DAUID2 to be reactive to, at any of these occasions:

The first time the beacon receiver device $A_2$-$A_4$, $P_1$; $MD_1$-$MD_3$ hears (receives) the short-range wireless beacon advertisement signal 112; BA on the first beacon broadcast channel and in response contacts the server SS (cf steps 310, 312 in FIGS. 3B and 3C). The server SS may then inform the beacon receiver device A$_2$-A$_4$, P$_1$; MD$_1$-MD$_3$ about the next dynamically allocated unique identity DAUID1 to be reactive to.

If the beacon receiver device P$_1$ is in passive mode, when it has been awaken by a beacon trigger signal 116; BT$_1$ containing a dynamically allocated unique identity DAUID1 and in response communicates with the server SS (SP) (cf steps 316, 318, 318*b* in FIG. 3E). The server SS (SP) may then inform the beacon receiver device P$_1$ about the next dynamically allocated unique identity DAUID2 to be reactive to.

Hence, it is to be noticed that the term "dynamically allocated unique identity" means that the unique identity DAUID1; DAUID2, which defines the alternate beacon broadcast channel 118) by being included in the short-range wireless beacon trigger signal 116; BT$_1$; BT$_2$, is not predefined or fixed but is, in contrast, generated at runtime by the server SS (SP) (or, in alternative embodiments, the beacon transmitter device BTD), as the skilled person will realize from the description of this document.

Moreover, it is to be noticed that the terms "first beacon broadcast channel" (114) and "alternate beacon broadcast channel" (118), as used in this document, are to be construed to mean logically separable (by the intended receiver) communications over a beacon broadcast medium. The logical separation is obtained by including different identities (PUID and DAUID1; DAUID2, respectively) in a beacon broadcast signal of any given physical format, wherein these different identities differentiate the first beacon broadcast channel from the alternate beacon broadcast channel. The physical beacon broadcast signal format may be hence the same for the beacon advertisement signal and the beacon trigger signal, with the differentiation being made solely by the different identities included in the signals. In embodiments where the beacon broadcast medium is iBeacon and/or BLE, these different identities will typically be different values of an UUID. The two logical "first beacon broadcast channel" (114) and "alternate beacon broadcast channel" (118) are therefore not to be confused with, for instance, the three dedicated physical advertisement channels 37-39 among the physical channels 0-39 in the 2.4 MHz ISM band according to the BLE standard.

The novel and inventive functionally as described herein is believed to be advantageous for use in a beacon communication system 100' like in FIGS. 3A-3F, and/or a beacon communication system 100" like in FIG. 4. Particulars of such a beacon communication system are disclosed in the Swedish patent applications 1450293-4 "ESTABLISHING A GROUP BASED ON AUDIO SIGNALLING", SE 1451203-2 "COMMUNICATION DEVICE FOR IMPROVED SHARING OF CONTENT", SE 1400535-9 "SELECTIVE USER INTERACTION IN A DYNAMIC, PROXIMITY-BASED GROUP OF WIRELESS COMMUNICATION DEVICES", SE 1550357-6 "ASSET AUTHENTICATION IN A DYNAMIC, PROXIMITY-BASED NETWORK OF COMMUNICATION DEVICES", SE 1451509-2 "COMMUNICATION DEVICE FOR IMPROVED ESTABLISHING OF A CONNECTION BETWEEN DEVICES", SE 1551329-4 "IMPROVED ABILITY TO DETECT PASSIVE BEACON RECEIVER DEVICES IN A SHORT-RANGE WIRELESS BEACON COMMUNICATION SYSTEM", and SE 1551557-0 "IMPROVED METHOD OF PROVIDING A SERVICE BY A SERVICE TERMINAL TO A USER OF A MOBILE DEVICE, AND AN ASSOCIATED COMMUNICATION SYSTEM", the contents of which are incorporated herein in their entirety.

For instance, the novel and inventive functionally as described herein may enable a more secure management and communication with the subset of users that may detect an audio signal as they may be the only users that are actually able to communicate via the temporary DAUID.

Moreover, the novel and inventive functionally as described herein may enable an immediate way to reach passive users with a new beacon broadcast, as they may be deafened out otherwise.

Also, the novel and inventive functionally as described herein may enable a possibility to communicate selectively with only a subset of all reachable users as they may be the only users that are actually able to communicate via the temporary DAUID.

Furthermore, the novel and inventive functionally as described herein may enable a more secure authentication of identities as the authentication handshake protocol may be made over a fresh and randomly generated DAUID.

Additionally or alternatively, the novel and inventive functionally as described herein may enable a faster way to identify passive mobile users as passive users are contacted with an UUID that has not been used before (i.e. DAUID). The communication with passive users may also be triggered by events instead of being based on regular time intervals.

Last but not least, the novel and inventive functionally as described herein may enable a faster way to identify a passive mobile user that is next in line to pay, as passive users are contacted with an UUID that has not been used before (i.e. DAUID). The communication is also more secure as it may be made over a fresh randomly generated DAUID. The communication with passive users may also be triggered by the event as the cashier registers a new customer. It is further possible to have an even more secure authentication of identities as the authentication handshake protocol may be made over a fresh randomly generated DAUID.

Figure 6A:
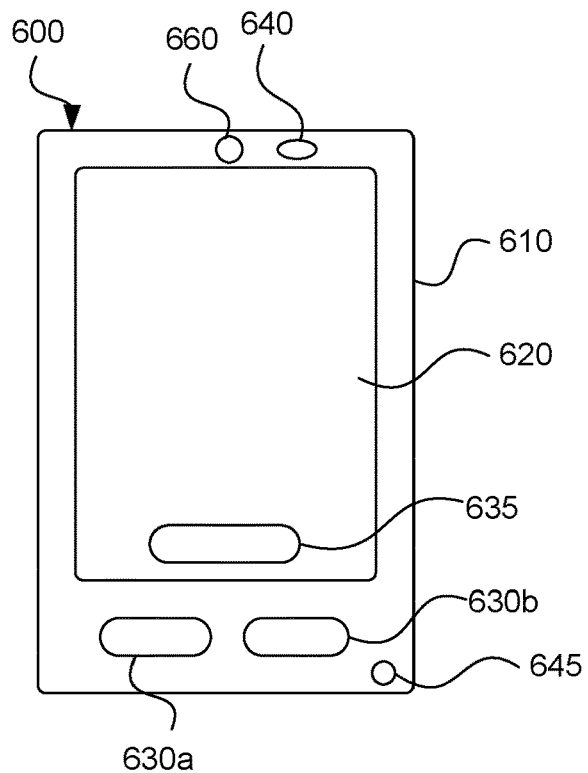
FIGS. 6A and 6B are schematic views of a mobile communication device according to two respective embodiments.
Figure 6B:
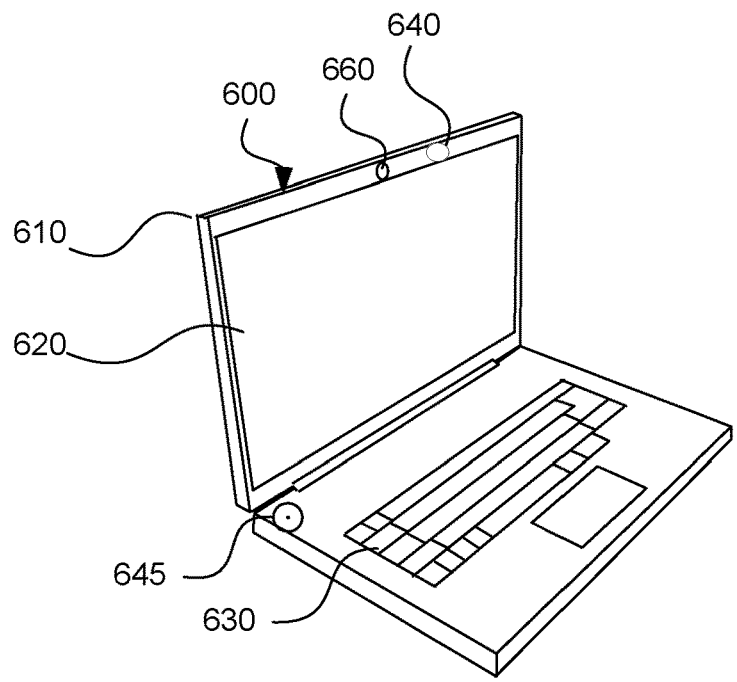

FIGS. 6A and 6B generally show a mobile, or wireless, communication device 600 which may implement any of the beacon transmitter devices 110, beacon receiver devices 120 and mobile devices A$_1$-A$_4$, P$_1$ as referred to above. Referring to FIG. 6A, the wireless communication device is a mobile telecommunications terminal in the form of a smartphone or a tablet computer (arranged with a wireless communication interface), comprising a housing 610 in which a display 620 is arranged. In one embodiment the display 620 is a touch display. In other embodiments the display 620 is a non-touch display. Furthermore, the smartphone 600 comprises two keys 630*a*, 630*b*. In this embodiment there are two keys 630, but any number of keys is possible and depends on the design of the smartphone 600.

In one embodiment the smartphone 600 is configured to display and operate a virtual key 635 on the touch display 620. It should be noted that the number of virtual keys 635 depends on the design of the smartphone 600 and an application that is executed on the smartphone 600. The smartphone 600 may also be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The smartphone 600 may also be equipped with a loudspeaker 640 and a microphone 645.

Referring to FIG. 6B, a laptop computer 600 comprises a display 620 and a housing 610. The housing comprises a controller or CPU (not shown) and one or more computer-readable storage media (not shown), such as storage units and internal memory. Examples of storage units are disk drives or hard drives. The laptop computer 600 further comprises at least one data port. Data ports can be wired and/or wireless. Examples of data ports are USB (Universal Serial Bus) ports, Ethernet ports or WiFi (according to IEEE standard 802.11) ports. Data ports are configured to enable the laptop computer 600 to connect with other computing devices or a server.

The laptop computer 600 further comprises at least one input unit such as a keyboard 630. Other examples of input units are computer mice, touch pads, touch screens or joysticks, to name a few.

The laptop computer 600 may further be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The laptop computer 600 may also be equipped with a loudspeaker 640 and a microphone 645. The wireless communication device 600 according to FIG. 6A or FIG. 6B may be configured to detect and track an object, for instance a hand of a user, via the camera 660.

Figure 7:
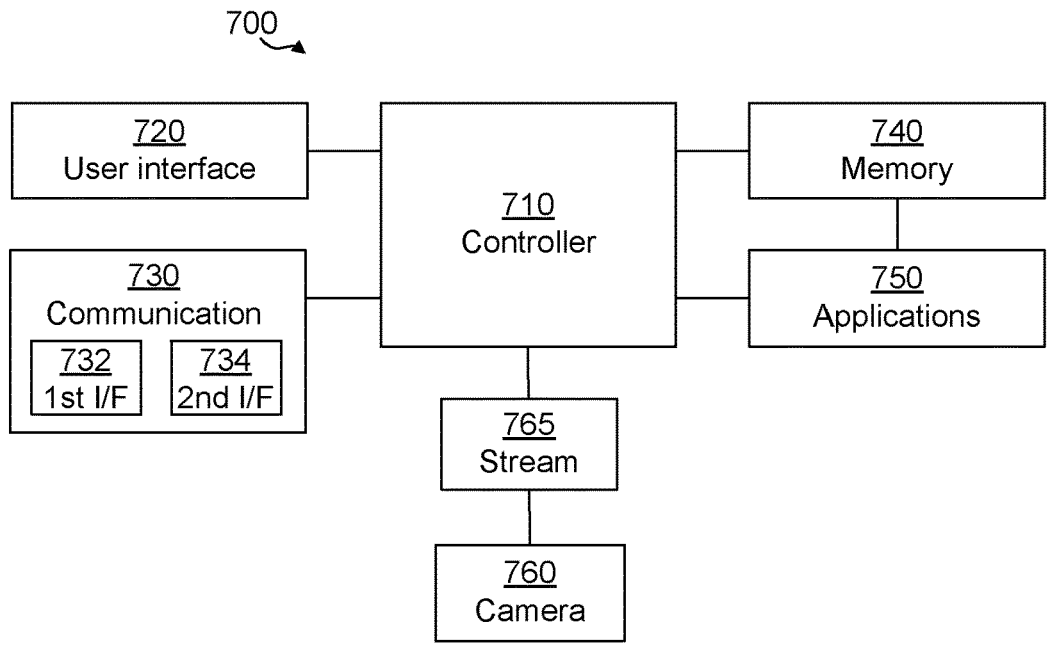
FIG. 7 is a schematic view of components of the mobile communication device in FIG. 6A or 6B.

FIG. 7 shows a schematic view of the general structure of a communication device according to FIG. 6A or FIG. 6B. The device 700 comprises a controller 710 which is responsible for the overall operation of the wireless communication device 700 and is preferably implemented by any commercially available CPU ("Central Processing Unit"), DSP ("Digital Signal Processor") or any other electronic programmable logic device. The controller 710 is configured to read instructions from a memory 740 and execute these instructions to control the operation of the wireless communication device 200. The memory 740 may be implemented using any commonly known technology for computer-readable memories such as ROM, RAM, SRAM, DRAM, CMOS, FLASH, DDR, SDRAM or some other memory technology. The memory 740 is used for various purposes by the controller 710, one of them being for storing application data and program instructions 750 for various software modules in the wireless communication device 700. The software modules may include a real-time operating system, drivers for a user interface 720, an application handler as well as various applications 750.

The wireless communication device 700 further comprises the user interface 720, which in the devices 700 of FIGS. 6A and 6B is comprised of the display 620 and the keys 630, 635. The user interface may also comprise the microphone 645 and the loudspeaker 644.

The wireless communication device 700 further comprises wireless communication means 730, which is adapted to allow the wireless communication device 700 to communicate with other devices through the use of different radio frequency technologies. More specifically, the wireless communication means 730 comprises a first communication interface 732 for short-range wireless beacon broadcast messaging. The first communication interface 732 may, advantageously, be implemented as an iBeacon and/or Bluetooth Low Energy (BLE)/Bluetooth 4.0 compliant communication interface.

Moreover, the wireless communication means 730 comprises a second communication interface 734 for communicating with a server like the system server SS and/or the service provider SP via the communication network NW. The communication with the server typically occurs at a substantially higher bandwidth than the short-range wireless beacon broadcast messaging. The server may be a standalone computing resource external to the wireless communication device 700, a cloud-based (distributed) computing resource, or, in alternative embodiments, implemented at least partly in and by the wireless communication device 700. The second communication interface 734 may, advantageously, be implemented as a communication interface compliant with IEEE 802.11, IEEE 802.15, ZigBee, WirelessHART, WiFi, Bluetooth®, WCDMA, HSPA, GSM, UTRAN, UMTS, and LTE, to name a few. It should be noted that, as is commonly known, the wireless communication means 730 may be arranged to communicate according to more than one technology and many different combinations may therefore be available; for example, a smartphone is commonly arranged to communicate according to the Bluetooth® standard, the WiFi standard and the LTE standard.

The wireless communication device 700 is further equipped with a camera 760. The camera 760 is a digital camera that is arranged to take video or still photographs by recording images on an electronic image sensor (not shown). The camera 760 is operably connected to the controller 710 to provide the controller with a video stream 765, i.e. the series of images captured, for further processing possibly for use in and/or according to one or several of the applications 750. In one embodiment the camera 760 is an external camera or source of an image stream.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 8:
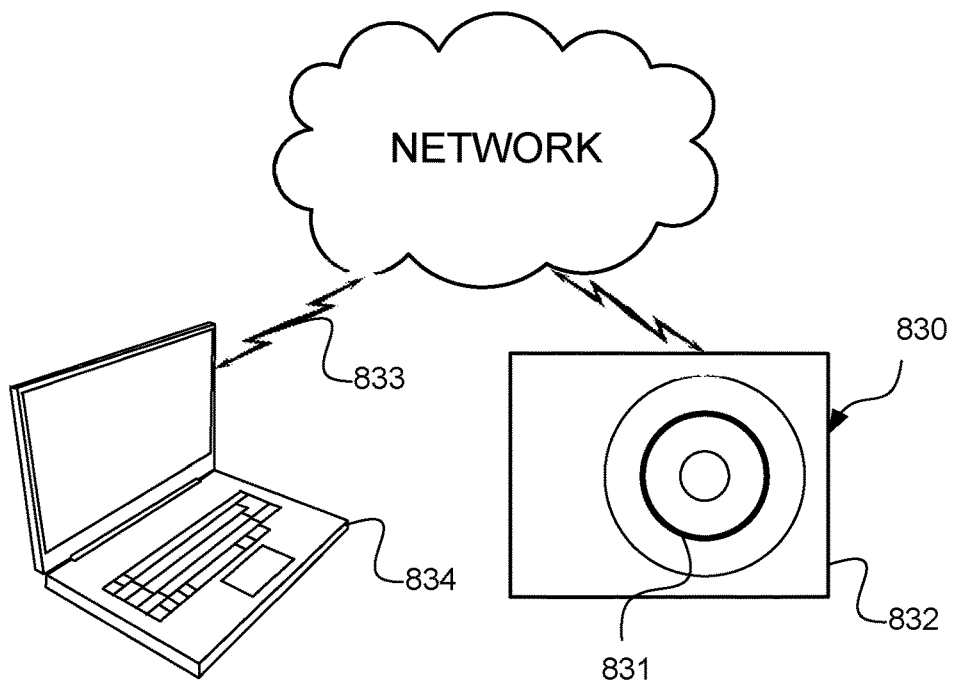
FIG. 8 is a schematic view of a computer-readable medium.

FIG. 8 shows a schematic view of a computer-readable medium as described in the above. The computer-readable medium 830 is in this embodiment a data disc 830. In one embodiment the data disc 830 is a magnetic data storage disc. The data disc 830 is configured to carry instructions 831 that when loaded into a controller, such as a processor, executes a method or procedure according to the embodiments disclosed above. The data disc 830 is arranged to be connected to or within and read by a reading device 832, for loading the instructions into the controller. One such example of a reading device 832 in combination with one (or several) data disc(s) 830 is a hard drive. It should be noted that the computer-readable medium can also be other media such as compact discs, digital video discs, flash memories or other memory technologies commonly used.

The instructions 831 may also be downloaded to a computer data reading device 834, such as a laptop computer or other device capable of reading computer coded data on a computer-readable medium, by comprising the instructions 831 in a computer-readable signal 833 which is transmitted via a wireless (or wired) interface (for example via the Internet) to the computer data reading device 834 for loading the instructions 831 into a controller. In such an embodiment the computer-readable signal 833 is one type of a computer-readable medium 830. The instructions may be stored in a memory (not shown explicitly in FIG. 8, but referenced as 740 in FIG. 8) of the computer data reading device 834.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The various functionality described in this document may be performed in part or fully in a wireless communication device 700 comprising a controller as disclosed above with reference to FIGS. 6A, 6B and 7, and/or caused to be performed by executing instructions stored on a computer-readable medium as disclosed with reference to FIG. 8.

Any server described in this document may generally be implemented by any suitable computing resource, such as a stationary computer, a portable computer, a mobile device, or a cloud computing resource. The server has a communication interface for broadband data communication, in accordance with one or more standards or protocols that also the relevant devices in the beacon communication system are compliant with. Examples of such standards include IEEE 802.11, IEEE 802.15, ZigBee, WirelessHART, WiFi, WCDMA, HSPA, GSM, UTRAN, UMTS, and LTE. Such broadband data communication is indicated in the drawings by way of thick outlined arrows, whereas communication of beacon signals is indicated in the drawings by way of thin black arrows.

The location of applications programs, or apps, as referred to in this document with respect to a hierarchical software model is not critical; hence, they may be located at an application layer or alternatively at a lower layer, such as for instance being part of an operating system.

Even though the embodiments described above are based on beacon systems where a first beacon broadcast channel is represented by a first universally unique identifier and an alternate beacon broadcast channel is represented by a second universally unique identifier which is different from the first universally unique identifier, the invention may be applied also to other types of beacon systems. For instance, the invention may be applied to beacon system like AltBeacon, URIBeacon and Eddystone, which do not use a UUID but another form of identity (such as a tiny URL) in the 31-byte GAP BLE packet for the beacon advertisement signal.

The terms "first beacon broadcast channel" and "alternate beacon broadcast channel" as used herein may be construed to mean logically separable (by the intended receiver) communications over a beacon broadcast medium. The logical separation may, for instance, be obtained by including different identities in a beacon broadcast signal of any given format, wherein the different identities differentiate the first beacon broadcast channel from the alternate beacon broadcast channel. The beacon broadcast signal format as such may be hence the same for the beacon advertisement signal and the beacon trigger signal, with the differentiation being made solely by the different identities included in the signals. In embodiments where the beacon broadcast medium is iBeacon and/or BLE, such different identities may, for instance, be different values of an UUID (cf PUID, DAUID1 and DAUID2 above).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A beacon communication system comprising a short-range wireless beacon transmitter device and a short-range wireless beacon receiver device, wherein the short-range wireless beacon transmitter device is configured to repeatedly transmit a short-range wireless beacon advertisement signal on a first beacon broadcast channel, the first beacon broadcast channel being defined by a predefined unique identity included in the short-range wireless beacon advertisement signal, the predefined unique identity remaining fixed between subsequent transmissions of the short-range wireless beacon advertisement signal, and wherein the short-range wireless beacon transmitter device is configured to temporarily transmit a short-range wireless beacon trigger signal on an alternate beacon broadcast channel, the alternate beacon broadcast channel being defined by a dynamically allocated unique identity included in the short-range wireless beacon trigger signal, the dynamically allocated unique identity being different from the predefined unique identity and being different between subsequent transmissions of the short-range wireless beacon trigger signal.

2. The beacon communication system as defined in claim 1, wherein the short-range wireless beacon advertisement signal is adapted for causing short-range wireless beacon receiver devices IN proximity of the short-range wireless beacon transmitter device to contact a server over a broadband network to register their presence in the proximity of the short-range wireless beacon transmitter device.

3. The beacon communication system as defined in claim 2, wherein the short-range wireless beacon advertisement signal is adapted for announcing to the short-range wireless beacon receiver devices in the proximity of the short-range wireless beacon transmitter device about the availability of a dynamic ad-hoc network of beacon transmitter devices which the short-range wireless beacon transmitter device is a member of.

4. The beacon communication system as defined in claim 2, wherein the short-range wireless beacon advertisement signal is adapted for inviting the short-range wireless beacon receiver devices in the proximity of the short-range wireless beacon transmitter device to use a service offered by a service terminal associated with the short-range wireless beacon transmitter device.

5. The beacon communication system as defined in claim 4, wherein the dynamically allocated unique identity is generated by a server and communicated by the server to the short-range wireless beacon transmitter device over a broadband network.

6. The beacon communication system as defined in claim 5, wherein the dynamically allocated unique identity generated by the server is communicated by the server also to the short-range wireless beacon receiver device over the broadband network.

7. The beacon communication system as defined in claim 5, wherein the dynamically allocated unique identity generated by the server and communicated by the server to the short-range wireless beacon transmitter device is communicated by the short-range wireless beacon transmitter device to the short-range wireless beacon receiver device in a short-range wireless beacon signal.

8. The beacon communication system as defined in claim 5, wherein the short-range wireless beacon transmitter device is configured to detect an event in the beacon communication system and in response send a request over the broadband network to the server to cause the server to generate the dynamically allocated unique identity.

9. The beacon communication system as defined in claim 8, wherein the event is related to the service offered by the service terminal associated with the short-range wireless beacon transmitter device.

10. The beacon communication system as defined in claim 8, wherein the event is related to a request for authentication by another short-range wireless beacon receiver device in proximity of the short-range wireless beacon transmitter device.

11. The beacon communication system as defined in claim 1, wherein the short-range wireless beacon trigger signal is adapted for causing the short-range wireless beacon receiver device to perform an activity.

12. The beacon communication system as defined in claim 1, wherein the short-range wireless beacon trigger signal is adapted for causing the short-range wireless beacon receiver device, when being in a passive mode, to enter into a short-range wireless beacon scanning mode.

13. The beacon communication system as defined in claim 1, wherein the dynamically allocated unique identity included in the short-range wireless beacon trigger signal is adapted to be received by all short-range wireless beacon receiver devices in proximity of the short-range wireless beacon transmitter device.

14. The beacon communication system as defined in any claim 1, wherein the dynamically allocated unique identity included in the short-range wireless beacon trigger signal is adapted to be received by a subset of all short-range wireless beacon receiver devices in proximity of the short-range wireless beacon transmitter device.

15. The beacon communication system as defined in claim 1, wherein the dynamically allocated unique identity included in the short-range wireless beacon trigger signal is adapted to be received by said short-range wireless beacon receiver device but not by other short-range wireless beacon receiver devices in proximity of the short-range wireless beacon transmitter device.

16. The beacon communication system as defined in claim 1, wherein the predefined unique identity included in the short-range wireless beacon advertisement signal and the dynamically allocated unique identity included in the short-range wireless beacon trigger signal represent different universally unique identifier values.

17. The beacon communication system as defined in claim 1, wherein the dynamically allocated unique identity is generated by the short-range wireless beacon transmitter device and is communicated by the short-range wireless beacon transmitter device to the short-range wireless beacon receiver device in a short-range wireless beacon signal.

18. A method of operating a beacon communication system which comprises a short-range wireless beacon transmitter device and a short-range wireless beacon receiver device, the method comprising:
repeatedly transmitting, by the short-range wireless beacon transmitter device, a short-range wireless beacon advertisement signal on a first beacon broadcast channel, the first beacon broadcast channel being defined by a predefined unique identity included in the short-range wireless beacon advertisement signal, the predefined unique identity remaining fixed between subsequent transmissions of the short-range wireless beacon advertisement signal; and
temporarily transmitting, by the short-range wireless beacon transmitter device, a short-range wireless beacon trigger signal on an alternate beacon broadcast channel, the alternate beacon broadcast channel being defined by a dynamically allocated unique identity included in the short-range wireless beacon trigger signal, the dynamically allocated unique identity being different from the predefined unique identity and being different between subsequent transmissions of the short-range wireless beacon trigger signal.

19. The method as defined in claim 18, further involving:
receiving the short-range wireless beacon trigger signal by the short-range wireless beacon receiver device; and
performing an activity by the short-range wireless beacon receiver device.

20. The method as defined in claim 19, wherein performing an activity by the short-range wireless beacon receiver device involves causing the short-range wireless beacon receiver device, when being in a passive mode, to enter into a short-range wireless beacon scanning mode.

21. A short-range wireless beacon transmitter device for use in a beacon communication system which furthermore comprises a short-range wireless beacon receiver device,
wherein the short-range wireless beacon transmitter device is configured to repeatedly transmit a short-range wireless beacon advertisement signal on a first beacon broadcast channel, the first beacon broadcast channel being defined by a predefined unique identity included in the short-range wireless beacon advertisement signal, the predefined unique identity remaining fixed between subsequent transmissions of the short-range wireless beacon advertisement signal, and
wherein the short-range wireless beacon transmitter device is configured to temporarily transmit a short-range wireless beacon trigger signal on an alternate beacon broadcast channel, the alternate beacon broadcast channel being defined by a dynamically allocated unique identity included in the short-range wireless beacon trigger signal, the dynamically allocated unique identity being different from the predefined unique identity and being different between subsequent transmissions of the short-range wireless beacon trigger signal.

* * * * *